US012238347B2

(12) United States Patent
Adeel et al.

(10) Patent No.: US 12,238,347 B2
(45) Date of Patent: Feb. 25, 2025

(54) INCIDENT CATEGORY SELECTION OPTIMIZATION (71) Applicant: Getac Technology Corporation, New Taipei (TW)

(72) Inventors: Muhammad Adeel, Edina, MN (US); Thomas Guzik, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 18/240,289

(22) Filed: Aug. 30, 2023

(65) Prior Publication Data

US 2023/0412851 A1 Dec. 21, 2023

Related U.S. Application Data (63) Continuation of application No. 17/570,887, filed on Jan. 7, 2022, now Pat. No. 11,785,266.

(51) Int. Cl.
H04N 21/218 (2011.01)
G06F 16/2457 (2019.01)
G06F 16/38 (2019.01)
G06Q 50/26 (2012.01)
H04N 21/25 (2011.01)
(Continued)

(52) U.S. Cl.
CPC ..... *H04N 21/218* (2013.01); *G06F 16/24578* (2019.01); *G06F 16/38* (2019.01); *G06Q 50/26* (2013.01); *H04N 21/251* (2013.01); *H04N 21/422* (2013.01); *H04N 21/44* (2013.01)

(58) Field of Classification Search
None
See application file for complete search history.

(56) References Cited

U.S. PATENT DOCUMENTS 9,615,136 B1 4/2017 Emery et al.
10,511,801 B2 12/2019 Guzik et al.
10,958,868 B2 3/2021 Guzik et al.
(Continued)

FOREIGN PATENT DOCUMENTS

EP 3764246 A1 * 1/2021 ....... G06F 16/24578
TW 20131 4627 A 4/2013

OTHER PUBLICATIONS

International Patent Application No. PCT/US2023/010197, International Search Report and Written Opinion mailed May 12, 2023, 12 pages.
(Continued)

*Primary Examiner* — Omar S Parra
(74) *Attorney, Agent, or Firm* — Finnegan, Henderson, Farabow, Garrett & Dunner, LLP (57) ABSTRACT This disclosure describes techniques that enable a categorization controller to detect activation of a portable recording device that is configured to capture a real-time multimedia stream of the current event. The categorization controller may further identify a set of categories that are likely associated with the real-time multimedia stream, determine an ordered ranking of the set of categories, and generate a ranked category dataset for delivery to the portable recording device. In doing so, the portable recording device may present the ordered ranking of the set of categories at a user interface.

20 Claims, 8 Drawing Sheets (51) Int. Cl.
*H04N 21/422* (2011.01)
*H04N 21/44* (2011.01)

(56) References Cited

U.S. PATENT DOCUMENTS

| | | |
|---|---|---|
| 11,516,427 B2 | 11/2022 | Guzik et al. |
| 2005/0283470 A1 | 12/2005 | Kuntzman et al. |
| 2009/0027499 A1 | 1/2009 | Nicholl |
| 2010/0118163 A1 | 5/2010 | Matsugu et al. |
| 2010/0274816 A1 | 10/2010 | Guzik |
| 2011/0018998 A1 | 1/2011 | Guzik |
| 2012/0236178 A1 | 9/2012 | Nusbaum |
| 2014/0104396 A1 | 4/2014 | Salow |
| 2014/0143545 A1 | 5/2014 | McKeeman et al. |
| 2014/0267650 A1 | 9/2014 | Wexler et al. |
| 2016/0062992 A1 | 3/2016 | Chen et al. |
| 2016/0227092 A1 | 8/2016 | Ikeda |
| 2016/0227173 A1 | 8/2016 | Yamaguchi et al. |
| 2016/0259461 A1 | 9/2016 | Abbate |
| 2016/0275376 A1 | 9/2016 | Kant |
| 2016/0360088 A1 | 12/2016 | Tanabiki et al. |
| 2016/0364616 A1 | 12/2016 | McLean et al. |
| 2017/0150037 A1 | 5/2017 | Rathod |
| 2017/0346820 A1 | 11/2017 | Valla |
| 2018/0131898 A1 | 5/2018 | Guzik et al. |
| 2018/0160053 A1 | 6/2018 | Tsuchiya et al. |
| 2019/0197354 A1 | 6/2019 | Law et al. |
| 2019/0197369 A1 | 6/2019 | Law et al. |
| 2020/0267503 A1 | 8/2020 | Natkins et al. |
| 2020/0358947 A1 | 11/2020 | Hagio et al. |
| 2021/0103611 A1 | 4/2021 | Kumar et al. |
| 2021/0176422 A1 | 6/2021 | Guzik et al. |
| 2022/0076556 A1* | 3/2022 | Lindenau ............... H04M 11/04 |

OTHER PUBLICATIONS

U.S. Appl. No. 15/686,142, Non Final Office Action mailed Apr. 8, 2019, 19 pages.
U.S. Appl. No. 15/686,142, Notice of Allowance mailed Jul. 31, 2019, 21 pages.
U.S. Appl. No. 16/677,545, Notice of Allowance mailed Nov. 19, 2020, 30 pages.
U.S. Appl. No. 17/179,908, Non Final Office Action mailed May 24, 2022, 37 pages.
U.S. Appl. No. 17/179,908, Notice of Allowance mailed Jul. 26, 2022, 27 pages.
U.S. Appl. No. 17/570,887, Final Office Action mailed Mar. 16, 2023, 17 pages.
U.S. Appl. No. 17/570,887, Notice of Allowance mailed Jun. 14, 2023, 23 pages.
U.S. Appl. No. 17/570,887, Office Action mailed Sep. 9, 2022, 33 pages.
Taiwan Intellectual Property Office, Office Action in related to Taiwan Application No. 112100531, mailed Feb. 1, 2024.

* cited by examiner

INCIDENT CATEGORY SELECTION OPTIMIZATION

CROSS REFERENCE TO RELATED APPLICATION

This application is a continuation of U.S. application Ser. No. 17/570,887, filed on Jan. 7, 2022, and titled "INCIDENT CATEGORY SELECTION OPTIMIZATION," which is herein incorporated by reference in its entirety.

BACKGROUND

Law enforcement agencies are increasingly equipping their law enforcement officers with portable recording devices. Such law enforcement agencies may have policies manding that their law enforcement officers use portable recording devices to record interactions with the public, to better serve and protect the public from improper policing, as well as to protect law enforcement officers from false allegations of police misconduct.

In the context of law enforcement, incidents and events captured by a portable recording device need to be categorized to support timely annotation and cross-referencing to incident report forms. However, the number of incident categories can become unwieldy, particularly when using a portable recording device which typically includes a limited user interface. Present-day, some portable recording devices include a dial or a sliding tab user interface that permits users (e.g., law enforcement officers) to scroll through a list of incident categories before making a selection. The selection process can at times prove frustrating, particularly since the list of incident categories available to a user, is long.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques that enable a categorization controller to detect activation of a portable recording device that is configured to capture a real-time multimedia stream of the current event. The categorization controller may further identify a set of categories that are likely associated with the real-time multimedia stream, determine an ordered ranking of the set of categories, and generate a ranked category dataset for delivery to the portable recording device. In doing so, the portable recording device may present the ordered ranking of the set of categories at a user interface.

The categorization controller may interact with the network operations center, the third-party server(s), and the portable recording device. The categorization controller may retrieve a computer-aided dispatch (CAD) identifier from the network operations center that is associated with a real-time incident. In one embodiment, the categorization controller may monitor and poll the network operations center to capture CAD identifiers. In another embodiment, the network operations center may push a newly generated CAD identifier to the categorization controller. The network operations center may assign a CAD identifier to each real-time incident. In one example, the CAD identifier may identify the incident type. Without limitation, the incident type may be a domestic disturbance, a traffic infraction, violent dispute, property damage, trespass, protest, or public nuisance. In this example, multiple real-time incidents may retain the same CAD identifier, based on the similarity of the incident type.

In another example, the CAD identifier may comprise a character string of two portions. The first portion may be associated with the incident type, and the second portion may uniquely distinguish the real-time incident from prior, successive, and contemporaneous real-time incidents. In this way, the CAD identifier may describe the incident type, and simultaneously distinguish a particular real-time incident from prior, successive, and contemporaneous real-time incidents.

The categorization controller may retrieve environmental data from a third-party server(s), third-party news reports, social media postings, weather reports, or the like, which describe the disposition of a surrounding environment and the real-time events that are proximate to the geolocation of the real-time incident. The categorization controller may first infer the geolocation of the portable recording device 106 that has been dispatched to a real-time incident, and then use the geolocation to capture environmental data from a third-party server(s).

The categorization controller may monitor and retrieve sensor data from the portable recording device. The sensor data may include the geolocation of the portable recording device (which, by extension, corresponds to a geolocation of the real-time incident), audio data recorded via the portable recording device by the law enforcement officer, and a real-time multimedia stream of the surrounding environment proximate to the portable recording device (which, by extension, corresponds to a real-time multimedia stream of the real-time incident).

The monitoring activity may occur continuously, per a predetermined schedule, or in response to a triggering event. Continuous monitoring occurs after the user (e.g., law enforcement officer) activates the portable recording device upon arrival at the geolocation of the real-time incident. Monitoring per a predetermined schedule may correspond to a monitoring activity occurring at any time interval, such as one minute, five minutes, 20 minutes, 30 minutes, or one hour. Monitoring in response to a triggering event may correspond to monitoring occurring in response to receipt of a message from the network operations center indicating that the portable recording device (and law enforcement officer) has been dispatched to a real-time incident at the geolocation.

The categorization controller may analyze at least one of the CAD identifier, the environmental data, or the sensor data to generate incident category data. The incident category data may comprise an ordered ranking of incident categories that likely describe the real-time incident. The incident category data may further include computer-executable instructions that present an ordered ranking of incident categories on a user interface (e.g., category wheel) of the portable recording device.

Further, the term "techniques," as used herein, may refer to system(s), method(s), computer-readable instruction(s), module(s), algorithms, hardware logic, and/or operation(s) as permitted by the context described above and through the document.

Figure 1:
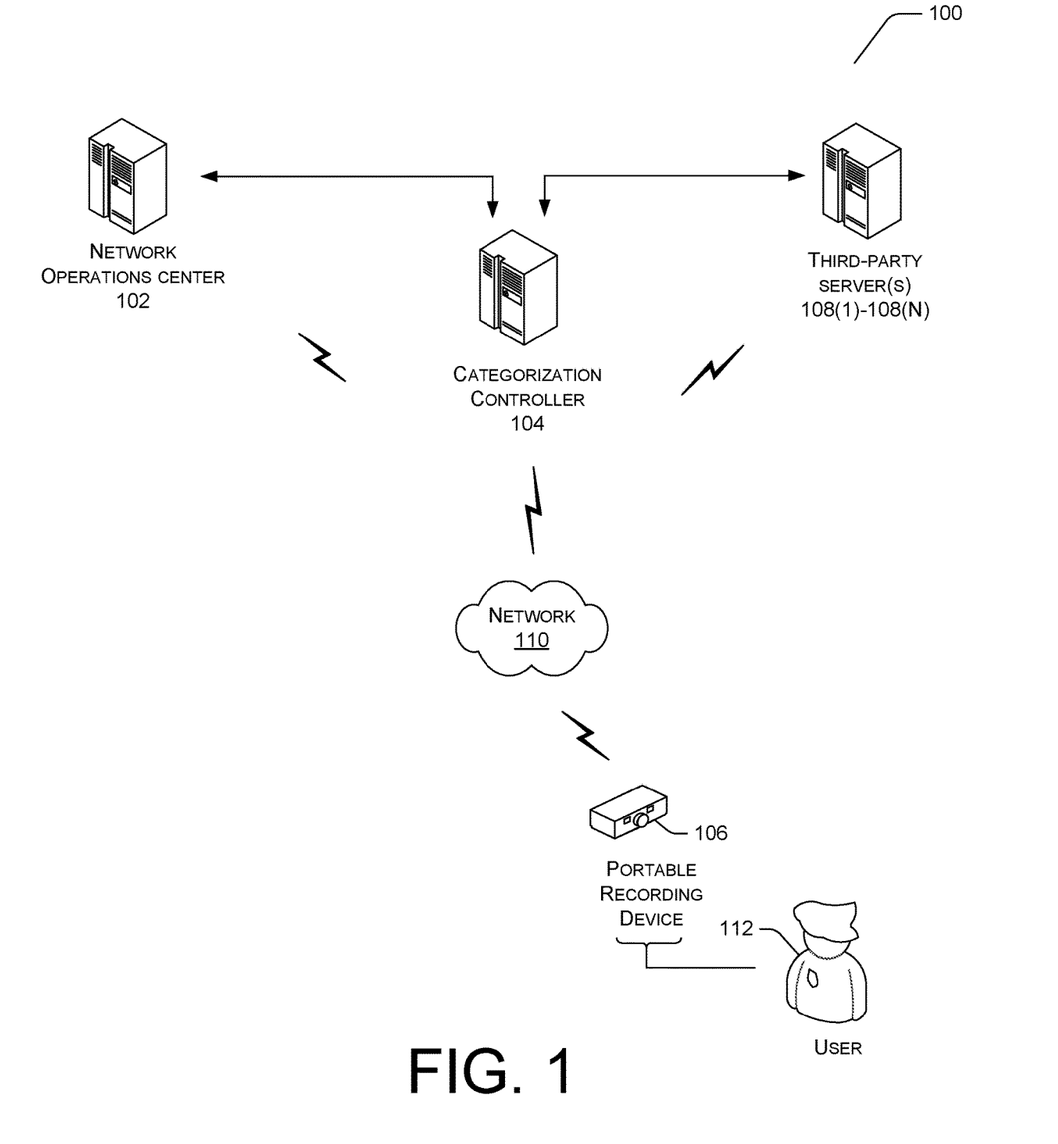
FIG. 1 illustrates an exemplary computing environment that facilitates the operation of the categorization controller.

FIG. 1 illustrates an exemplary computing environment that facilitates the operation of the categorization controller. The computing environment 100 may comprise a network operations center 102, a categorization controller 104, a portable recording device 106, and third-party server(s) 108(1)-108)N), each of which is operably connected via one or more network(s) 110.

The network operations center 102 may be configured to control the dispatch of law enforcement officers to real-time incidents. Further, the network operations center 102 may assign a computer-aided dispatch (CAD) identifier to each real-time incident. Each CAD identifier may be configured to uniquely identify an incident type. Without limitation, the incident type may be a domestic disturbance, a traffic infraction, violent dispute, property damage, trespass, protest, or public nuisance. In another embodiment, the CAD identifier may comprise a character string that comprises two portions. The first portion may be associated with the incident type, and the second portion may uniquely distinguish the real-time incident from prior and successive real-time incidents. In this way, the CAD identifier may describe the incident type, and simultaneously distinguish a particular real-time incident from prior, successive, and contemporaneous real-time incidents.

The third-party server(s) 108(1)-108(N) may comprise remote servers that provide environmental data associated with a real-time incident. In some embodiments, the categorization controller 104 may interact with the third-party server(s) 108(1)-108(N) to capture environmental data based on the geolocation of a portable recording device 106 that has been dispatched to a real-time incident. In one example, the geolocation of the portable recording device 106 is implied to correlate with the geolocation of the real-time incident. Environmental data may include third-party news reports, social media posting, weather reports, or the like, which describe the disposition of a surrounding environment and the real-time events that are occurring proximate to the current geolocation of the portable recording device.

The portable recording device 106 may be worn by a user 112, such as a law enforcement officer. The portable recording device 106 may be a portable video recording device, a portable audio recording device, or a portable multimedia recording device that captures sensor data from a surrounding environment proximate to the portable recording device 106. In one embodiment, the portable recording device may capture image data (e.g., in-motion video image data or still-motion image data) and audio data via one or more sensors (e.g., video image capturing component and microphone, respectively). Further, the portable recording device 106 may capture the current geolocation via a GPS sensor. Accordingly, the one or more sensors may include, without limitation, a microphone, a video image capturing component, and a GPS sensor. The portable recording device 106 may include onboard memory that stores instances of captured GPS data, audio data, image data, or multimedia data stream. The portable recording device 106 may be manually activated to capture a multimedia stream by the user 112 (e.g., law enforcement officer). For example, the portable recording device 106 may include an input interface (e.g., physical buttons, a gesture recognition mechanism, a voice activation mechanism) that enables the user 112 (e.g., law enforcement officer) to start, stop, and/or pause the recording of the real-time data.

The categorization controller 104 may be configured to determine an ordered ranking of incident categories associated with a real-time incident. In some examples, the categorization controller 104 may determine the ordered ranking based on a CAD identifier from the network operations center 102, environmental data from the third-party server(s) 108(1)-108(N), sensor data from a portable recording device 106, or any suitable combination thereof.

The categorization controller 104 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the portable recording device 106 via the one or more network(s) 110.

The one or more network(s) 110 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (e.g., 5G-NR, LTE, 3G, 2G), or any suitable combination thereof.

Figure 2:
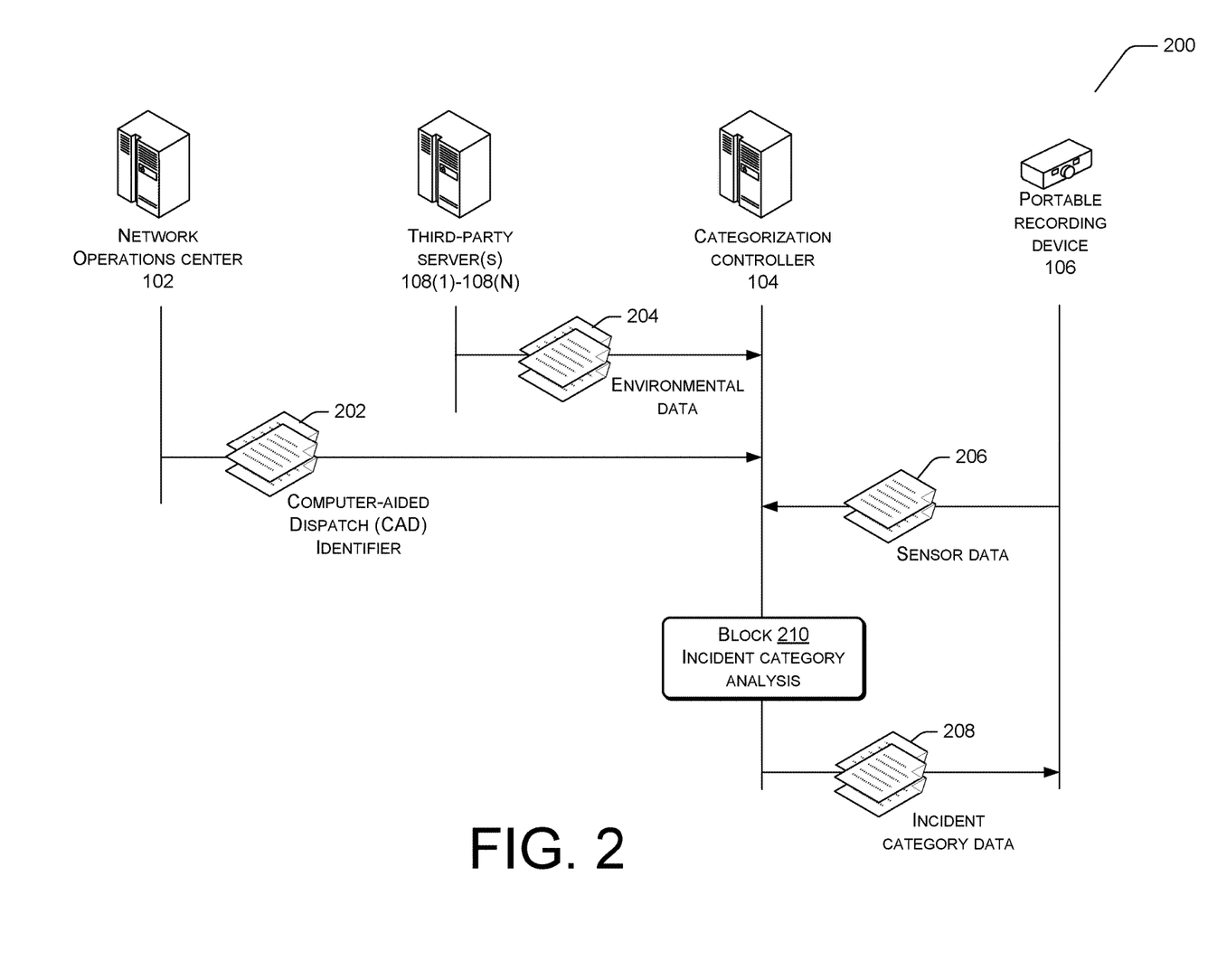
FIG. 2 illustrates a block diagram of an operation of the categorization controller in generating incident category data.

FIG. 2 illustrates a block diagram of an operation of the categorization controller in generating incident category data. In the illustrated example, the categorization controller 104 may interact with the network operations center 102, the third-party server(s) 108(1)-108)N), and the portable recording device 106. The categorization controller 104 may retrieve a computer-aided dispatch (CAD) identifier 202 from the network operations center 102 that is associated with a real-time incident. In one embodiment, the categorization controller 104 may monitor and poll the network operations center to capture CAD identifiers. In another embodiment, the network operations center 102 may push a newly generated CAD identifier 202 to the categorization controller 104. The network operations center 102 may assign a CAD identifier 202 to each real-time incident. In one example, the CAD identifier 202 may identify the incident type. Without limitation, the incident type may be a domestic disturbance, a traffic infraction, violent dispute, property damage, trespass, protest, or public nuisance. In this example, multiple real-time incidents may retain the same CAD identifier 202, based on the similarity of the incident type.

In another example, the CAD identifier 202 may comprise a character string of two portions. The first portion may be associated with the incident type, and the second portion may uniquely distinguish the real-time incident from prior, successive, and contemporaneous real-time incidents. In this way, the CAD identifier may describe the incident type, and simultaneously distinguish a particular real-time incident from prior, successive, and contemporaneous real-time incidents.

The categorization controller 104 may retrieve environmental data 204 from the third-party server(s) 108(1)-108(N). Environmental data 204 may include third-party news reports, social media postings, weather reports, or the like, which describe the disposition of a surrounding environment and the real-time events that are proximate to the geolocation of the real-time incident. The categorization controller 104 may first infer the geolocation of the portable recording device 106 that has been dispatched to a real-time incident, and then use the geolocation to capture environmental data from the third-party server(s).

The categorization controller 104 may monitor and retrieve sensor data 206 from the portable recording device. The sensor data 206 may include the geolocation of the portable recording device (which, by extension, corresponds to a geolocation of the real-time incident), audio data recorded via the portable recording device by the law enforcement officer, and a real-time multimedia stream of the surrounding environment proximate to the portable recording device (which, by extension, corresponds to a real-time multimedia stream of the real-time incident).

The monitoring activity may occur continuously, per a predetermined schedule, or in response to a triggering event. Continuous monitoring occurs after the user (e.g., law enforcement officer) activates the portable recording device upon arrival at the geolocation of the real-time incident. Monitoring per a predetermined schedule may correspond to a monitoring activity occurring at any time interval, such as one minute, five minutes, 20 minutes, 30 minutes, or one hour. Monitoring in response to a triggering event may correspond to monitoring occurring in response to receipt of a message from the network operations center 102 indicating that the portable recording device 106 (and law enforcement officer) has been dispatched to a real-time incident at the geolocation.

At block 210, the categorization controller 104 may analyze at least one of the CAD identifier 202, the environmental data 204, or the sensor data 206 to generate incident category data 208. The incident category data 208 may comprise an ordered ranking of incident categories that likely describe the real-time incident. The incident category data 208 may further include computer-executable instructions that present an ordered ranking of incident categories on a user interface (e.g., category wheel) of the portable recording device.

Figure 3:
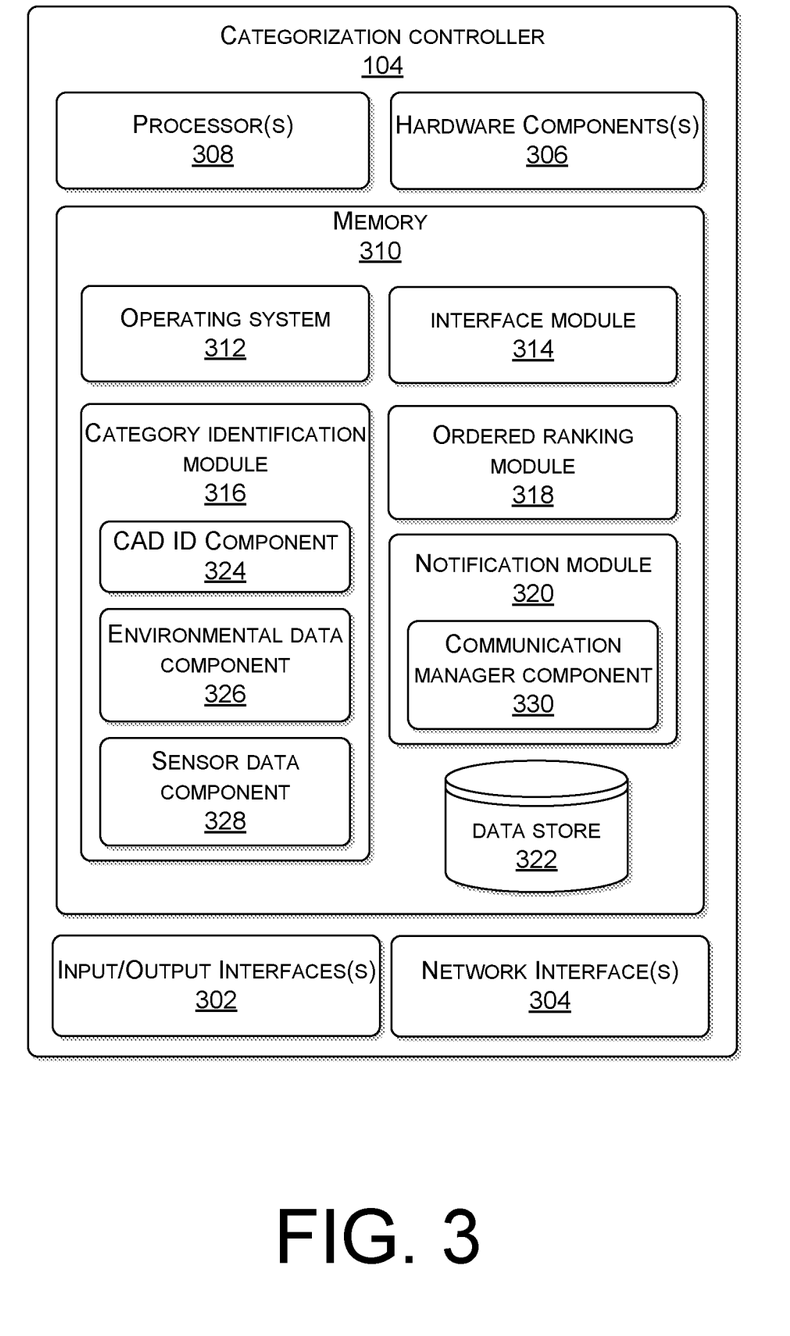
FIG. 3 illustrates a block diagram of various components of a categorization controller.

FIG. 3 illustrates a block diagram of various components of a categorization controller. The categorization controller 104 is configured to generate an ordered ranking of incident categories that are associated with a real-time incident. The categorization controller 104 may include input/output interface(s) 302. The input/output interface(s) 302 may include any suitable type of output interface known in the art, such as a display (e.g., a liquid crystal display), speakers, a vibrating mechanism, or a tactile feedback mechanism. Input/output interface(s) 302 also includes ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the categorization controller 104 may include network interface(s) 304. The network interface(s) 304 may include any suitable sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g., Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the categorization controller 104 may include one or more processor(s) 308 that are operably connected to memory 310. In at least one example, the one or more processor(s) 308 may be a central processing unit(s) (CPU), graphics processing unit(s) (GPU), or both a CPU and GPU or any suitable sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable, and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any suitable non-transitory medium which can be used to store the desired information.

In the illustrated example, the memory 310 may include an operating system 312, an interface module 314, a category identification module 316, an ordered ranking module 318, a notification module 320, and a data store 322. The operating system 312 may be any suitable operating system capable of managing computer hardware and software resources. The operating system 312 may include an interface layer that enables applications to interface with the input/output interface(s) 302 and the network interface(s) 304.

The interface module 314 may be configured to interact with the network operations center to capture a CAD identifier associated with a real-time incident, and further interact with the third-party server(s) to capture environmental data associated with a real-time incident. Further, the interface module 314 may interact with the portable recording device(s) to capture sensor data associated with a real-time incident. Particularly, the interface module 314 may monitor the portable recording device to capture the sensor data at the geolocation, or proximate to the geolocation, of a real-time incident. The monitoring activity may occur continuously, per a predetermined schedule, or in response to a triggering event. Continuous monitoring implies that the user (e.g., law enforcement officer) activates the portable recording device upon arrival at the geolocation of the real-time incident. The predetermined schedule may correspond to any time interval, such as one minute, five minutes, 20 minutes, 30 minutes, or one hour. The triggering event may correspond to receipt of a message from the network operations center indicating that the portable recording device (and law enforcement officer) has been dispatched to a real-time incident at the geolocation.

The interface module 314 may further transmit incident category data to a portable recording device. The incident category data may include computer-executable instructions that present an ordered ranking of incident categories on a user interface (e.g., category wheel) of the portable recording device.

The category identification module 316 may be configured to generate a list of incident categories that are likely associated with a real-time incident. The category identification module 316 may further include a CAD ID component 324, an environmental data component 326, and a sensor data component 328. The CAD ID component 324 may be configured to analyze a CAD identifier to determine a listing of incident categories. For example, the network operations center may issue a CAD identifier for each real-time incident. Each CAD identifier may be configured to uniquely identify an incident type associated with a real-time incident. Without limitation, the incident type may be a domestic disturbance, a traffic infraction, violent dispute, property damage, trespass, protest, or public nuisance. Accordingly, the CAD ID component 324 may analyze the CAD identifier to infer one or more incident categories. Particularly, the CAD ID component 324 may compare the CAD identifier to data entries within a predefined CAD-incident type data set to infer one or more incident categories. The predefined CAD-incident type data set may comprise a data structure that correlates individual CAD identifiers, or portion thereof (e.g., if the CAD identifier comprises two portions, the data structure would include a correlation to the first portion that is associated with the incident type) with corresponding incident types.

The environmental data component 326 may be configured to interact with the third-party server(s) to capture environmental data associated with a real-time incident. The environmental data component 326 may determine the geolocation of a portable recording device, and in doing so, interrogate third-party server(s) to capture environmental data associated with the geolocation. The environmental data may correspond to third-party news reports, social media postings, weather reports, or the like, which describe the disposition of a surrounding environment and the real-time events that are proximate to the geolocation of the real-time incident. In one embodiment, the environmental data component 326 may infer the geolocation of the real-time incident based on the geolocation of the portable recording device (e.g., captured via sensor data from the portable recording device) that has been dispatched to a real-time incident. In another embodiment, the environmental data component 326 may infer the geolocation of the real-time incident based on receipt of a message from the network operations center indicating that the portable recording device (and law enforcement officer) has been dispatched to a real-time incident at the geolocation.

The sensor data component 328 may be configured to analyze sensor data retrieved from the portable recording device to infer one or more incident categories. The sensor data may include the geolocation of the portable recording device (which, by extension, corresponds to a geolocation of the real-time incident), audio data recorded via the portable recording device by the user (e.g., law enforcement officer), and a real-time multimedia stream of the surrounding environment proximate to the portable recording device (which, by extension, corresponds to a real-time multimedia stream of the real-time incident).

In one embodiment, the category identification module 316 may employ one or more trained machine-learning algorithms to infer a list of incident categories that are likely associated with the real-time incident. The category identification module 316 may generate the data model using historical incident data associated with historical instances of real-time incidents. Each historical instance of real-time incidents may include at least one of the CAD identifier, environmental data, sensor data, or any suitable combination thereof.

Accordingly, the category identification module 316 may correlate input data associated with a real-time incident (e.g., CAD identifier, sensor data, environmental data, or any suitable combination thereof) with data points of the data model to infer a likely list of incident categories associated with the real-time incident.

The ordered ranking module 318 may be configured to analyze the listing of one or more incident categories to infer an ordered ranking of incident categories. A superior ranking to afforded to the incident category that is most likely associated with the real-time incident. In some embodiments, the ordered ranking module 318 may employ one or more trained machine-learning algorithms to generate a data model to infer the ordered ranking of incident categories. The ordered ranking module 318 may generate the data model using historical incident data associated with historical real-time incidents. The historical incident data may include a correlation of incident categories with historical instances of real-time incidents. Each historical instance of real-time incidents may include at least one of the CAD identifier, environmental data, sensor data, or any suitable combination thereof.

Accordingly, the ordered ranking module 318 may correlate input data associated with a real-time incident (e.g., list of incident categories, CAD identifier, sensor data, environmental data, or any suitable combination thereof) with data points of the data model to infer a likely ordered ranking of incident categories associated with the real-time incident.

Further, the ordered ranking module 318 may assign accuracy scores to individual incident categories, based at least in part on the data model analysis. The accuracy score may reflect a quantitative measure of the likelihood that the incident category corresponds to a real-time incident. The accuracy score may be alpha-numeric (e.g., 0 to 10, or A to F), descriptive (e.g., low, medium, or high), based on color, (i.e. red, yellow, or green), or any other suitable rating scale. A high (e.g., superior) accuracy score (e.g., 7 to 10, high, or green) may reflect an inference that the incident category is likely associated with the real-time incident. A medium accuracy score (e.g., 4 to 6, medium, or yellow) may reflect an inference that the incident category may or may not be associated with the real-time incident. A low accuracy score (e.g., 1 to 3, low, or red) may reflect an inference that the incident category is unlikely associated with the real-time incident.

The notification module 320 may further include a communication manager component 330 that is configured to generate the incident category data for delivery to a portable recording device. The notification module 320 may interact with the ordered ranking module 318 to retrieve the ordered ranking of incident categories. The incident category data may include computer-executable instructions that are configured to present the ordered ranking of the incident categories via a user interface (e.g., category selector) of the portable recording device. For example, incident category data may be configured such that the first selection via a user interface of the portable recording device corresponds to the highest-ranking incident category of the ordered ranking of incident categories.

The data store 322 may include a repository of CAD identifiers from the network operations center, a predefined CAD-incident type data set, sensor data from portable recording device(s), environmental data from the third-party server(s), historical instances of incident category data, and any other data pertinent to an operation of the categorization controller 104.

The categorization controller 104, via various modules and components, may make use of one or more trained machine-learning algorithms such as supervised learning, unsupervised learning, semi-supervised learning, naïve Bayes, Bayesian network, decision trees, neural networks, fuzzy logic models, and/or probabilistic classification models.

Figure 4:
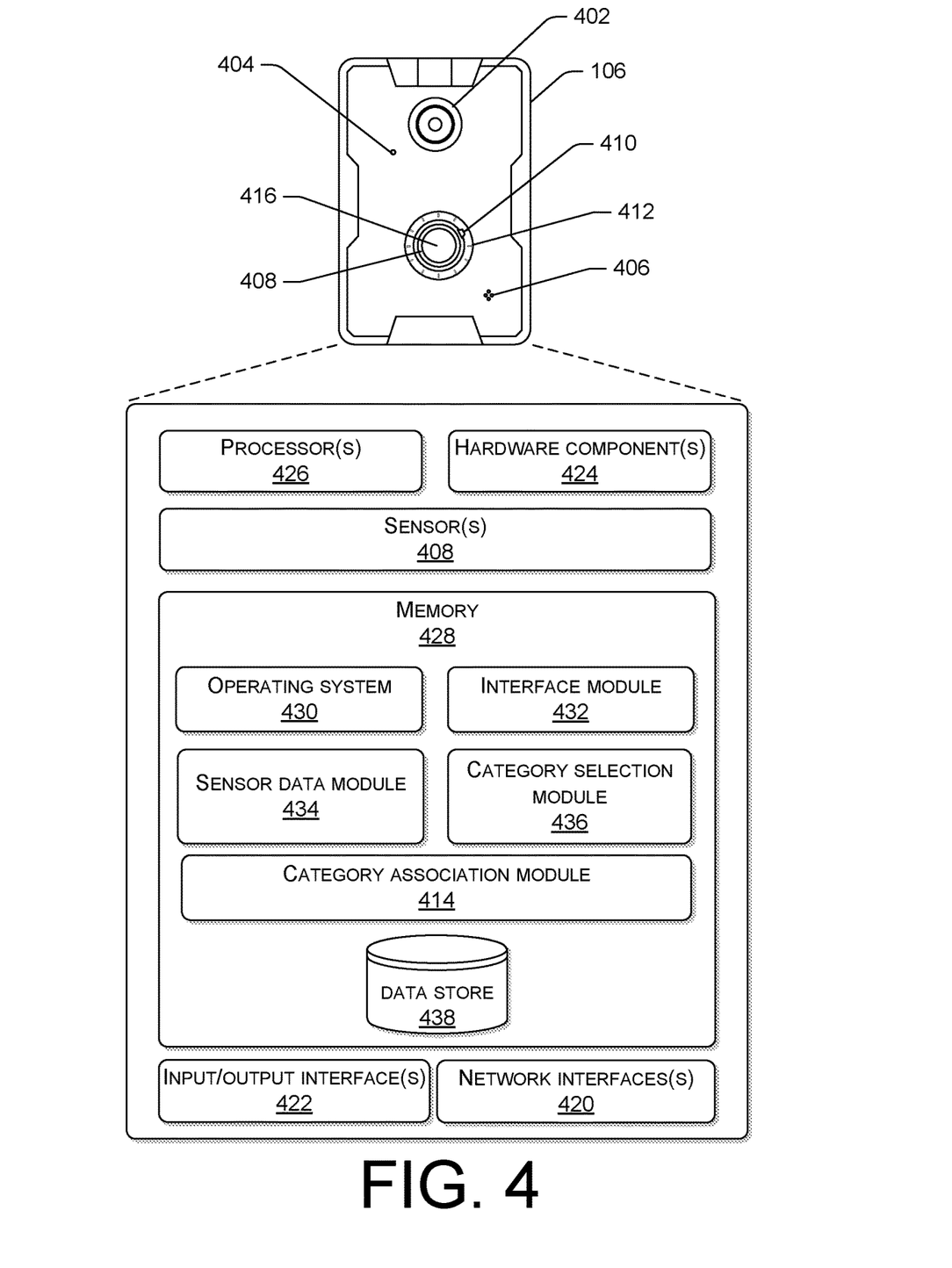
FIG. 4 illustrates an exemplary embodiment of a portable recording device.

FIG. 4 illustrates an exemplary embodiment of a portable recording device. In the illustrated example, the portable recording device 106 may include a video image capturing component 402 (e.g., camera) for capturing video image data, a microphone 404 for capturing audio data, and a speaker 406 for broadcasting audio data. The portable recording device may include a category selector. In the illustrated embodiment, the category selector may correspond to a category wheel 408. In other embodiments, the category selector may comprise any other form, such as a category slide. The category wheel 408 may include an indicator tab 410 that can align with preset radial position(s) 412 on the front face of the portable recording device 106. The indicator tab 410 may be configured to stop at a predetermined number of preset radial position(s) 412. Each of the preset radial position(s) 412 may correspond to a category classification that a user (e.g., law enforcement officer) may assign to a multimedia stream (e.g., real-time incident) captured by the portable recording device 106.

In one embodiment, the user (e.g., law enforcement officer) may use the category wheel 408 to assign an incident category before capturing a multimedia stream. In another embodiment, the user may use the category wheel 408 to assign an incident category while the multimedia stream is being captured. In yet another embodiment, an incident category may be assigned within a predetermined time period after the multimedia stream was captured. In each of these embodiments, once the multimedia stream has been captured, a controller (e.g., category association module 414) within the portable recording device 106 may execute software instructions that associate the incident category to the multimedia stream.

The portable recording device 106 may further include an activation button 416. The activation button 416 may be configured to cause the portable recording device 106 to perform one or more actions that depend on a present configuration of the portable recording device 106. The one or more actions may include starting and stopping the capturing of a multimedia stream, marking a point of interest while capturing a multimedia stream, or confirming a selection may be a user (e.g., law enforcement officer) while using the portable recording device 106.

The portable recording device may include one or more sensor(s) 418. Without limitation, the one or more sensor(s) 418 may include the microphone 404, the video image capturing component 402, and a GPS sensor.

The portable recording device 106 may interact with the network operations center 102 and the categorization controller 104 via network interface(s) 420. The network interface(s) 420 may functionally correspond to the network interface(s) 304. The portable recording device 106 may further include input/output interface(s) 422. The input/output interface(s) 422 may be functionally similar to the input/output interface(s) 302.

Additionally, the portable recording device 106 may include hardware component(s) 424, which are functionally similar to the hardware component(s) 306, and one or more processor(s) 426 operably connected to memory 428. The one or more processor(s) 426 may functionally correspond to the one or more processor(s) 308, and the memory 428 may functionally correspond to the memory 310. The memory 428 may further include an operating system 430, interface module 432, sensor data module 434, category selection module 436, a category association module 414, and a data store 438. The operating system 430 may be any operating system capable of managing computer hardware and software resources. The interface module 432 may be configured to interface with the network operations center 102 to receive a CAD identifier. Further, the interface module 432 may interface with the categorization controller 104 to receive incident category data and further transmit sensor data to the categorization controller 104. Without limitation, the sensor data may include geolocation data, audio data, video data, or any suitable combination thereof.

The sensor data module 434 may be configured to aggregate sensor data captured from the one or more sensor(s) 418. The category selection module 436 may be configured to interpret incident category data received from the categorization controller 104 to present an ordered ranking of incident categories on the category wheel. The category selection module 436 may assign the highest-ranking incident category of the ordered ranking of incident categories to a first selection on the category wheel 408. Subsequent selections on the category wheel 408 may be assigned subsequently ranked incident categories. A user may manipulate the category wheel 408 to move the indicator tab 410 to a preset position that corresponds to a chosen incident category. The user (e.g., law enforcement officer) may confirm a selection of a chosen incident category by pressing the activation button 416. In some embodiments, the category selection module 436 may cause the speaker 406 to annunciate an incident category associated with a preset position, at a point in time when the indicator tab 410 of the category wheel 408 aligns with the preset position.

The category association module 414 may be configured to execute software instructions that associate a selected incident category to the multimedia stream (e.g., sensor data) associated with the real-time incident.

Further, the data store 438 may include a repository of sensor data, incident category data, and any other suitable data pertinent to an operation of the portable recording device 106.

FIGS. 5 through 8 present processes 500, 600, 700, and 800 that relate to operations of the categorization controller 104. Each of the processes 500, 600, 700, and 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500, 600, 700, and 800 are described with reference to the computing environment 100 of FIG. 1.

Figure 5:
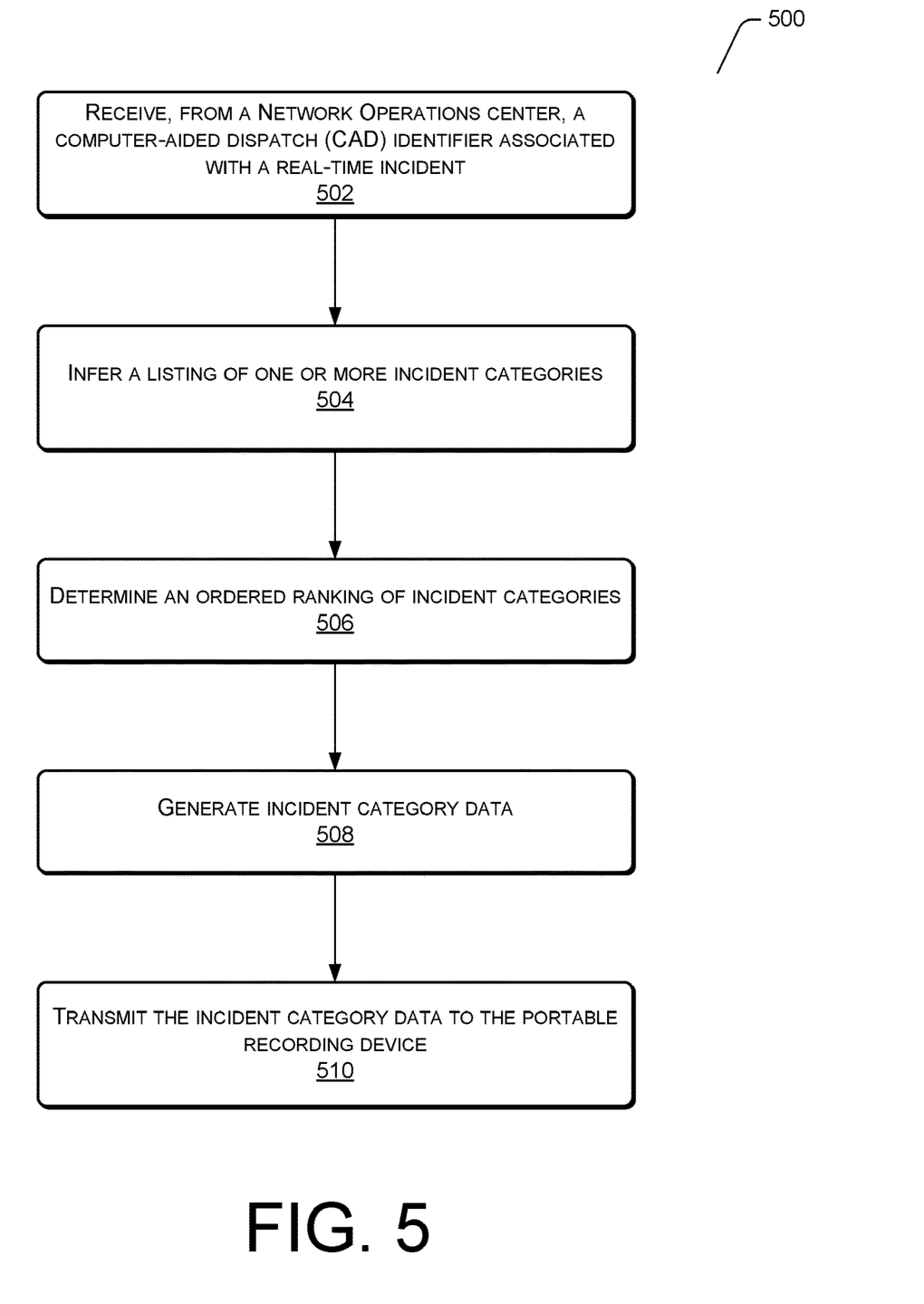
FIG. 5 illustrates a process for generating and transmitting incident category data to a portable recording device based at least in part on a CAD identifier.

FIG. 5 illustrates a process for generating and transmitting incident category data to a portable recording device based at least in part on a CAD identifier. Process 500 is described from the perspective of the categorization controller. In process 500, the categorization controller may interact with a network operations center, the portable recording device, and third-party server(s) that capture environmental data.

At 502, the categorization controller may receive from a network operations center, a computer-aided dispatch (CAD) identifier associated with a real-time incident. Here, the network operations center may assign a CAD identifier to each real-time incident. In one example, the network operations center may assign each real-time incident a CAD identifier that corresponds to the incident type. Without limitation, the incident type may be a domestic disturbance, a traffic infraction, violent dispute, property damage, trespass, protest, or public nuisance. In this example, multiple real-time incidents may retain the same CAD identifier, based on the similarity of the incident type.

In another example, the CAD identifier may comprise a character string of two portions. The first portion may be associated with the incident type, and the second portion may uniquely distinguish the real-time incident from prior, successive, and contemporaneous real-time incidents. In this way, the CAD identifier may describe the incident type, and simultaneously distinguish a particular real-time incident from prior, successive, and contemporaneous real-time incidents.

At 504, the categorization controller may identify a listing of one or more one or more incident categories that likely describe the real-time incident, based at least in part on the CAD identifier. In this example, the categorization controller may analyze the CAD identifier to identify the incident type, and in doing so, assign one or more incident categories. The incident category may be a granular representation of the incident type. For example, consider a real-time incident associated with a traffic infraction. While the incident type broadly envelopes a plethora of possible events, the incident categories aim to provide a granular selection of possible events. For example, of a traffic infraction incident type, the incident categories may include but are not limited to a speeding vehicle, a Driving Under the Influence (DUI) arrest, a combative DUI, a single-vehicle accident, multiple vehicle accident, a vehicle accident with injured persons, and so forth.

In this process step, the categorization controller may correlate the CAD identifier with a set of predefined CAD-incident type data set to identify the incident category. The predefined CAD-incident type data set may comprise a data structure that correlates individual CAD identifiers, or portion thereof (e.g., if the CAD identifier comprises two portions, the data structure would include a correlation to the first portion that is associated with the incident type) with corresponding incident types.

At 506, the categorization controller may employ one or more machine-learning algorithms to determine an ordered ranking of incident categories. The ordered ranking is intended to represent the likelihood that a real-time incident corresponds to a particular incident category. In one embodiment, the likelihood of occurrence may be based on the prevalence of one incident category occurring over others within an incident type, over a predetermined time period. Referring to the traffic infraction incident type, the most common incident category may be a "speeding vehicle" and the least common may be "multiple vehicle accident with injured persons." In this example, the categorization controller may rank the "speeding vehicle" incident category as most likely and the "multiple vehicle accident with injured persons" incident category as the least likely.

In another embodiment, the categorization controller may determine the ordered ranking of incident categories based on additional data. For example, the categorization controller may capture sensor data from a portable recording device (e.g., worn by a law enforcement officer) that has been dispatched to the real-time incident. When the law enforcement officer is at the scene of the real-time incident, the sensor data may include the geolocation of the portable recording device (which, by extension, corresponds to a geolocation of the real-time incident), audio data recorded via the portable recording device by the law enforcement officer, and a real-time multimedia stream of the surrounding environment proximate to the portable recording device (which, by extension, corresponds to a real-time multimedia stream of the real-time incident).

In this embodiment, the categorization controller may employ one or more machine-learning algorithms to analyze the sensor data to infer a likely ordered ranking of incident categories. The likely ordered ranking may be based on analysis of a multimedia stream captured from the portable recording device. For example, the categorization controller may employ natural language processing (NLP) and natural language understanding (NLU) algorithms to infer the meaning of captured speech. In doing so, the categorization controller may infer the likely nature of the incident, which in turn, may influence the ordered ranking of the incident categories. Here, the categorization controller may infer that the incident is likely a DUI based on analysis of speech, but also infer that the DUI is likely combative based on the tone of speech or nature of word selection.

Similarly, the categorization controller may employ one or more machine-learning algorithms to infer the ordered ranking of incident categories based on the historical prevalence of particular incident categories occurring at the geolocation. For example, the categorization controller may glean the geolocation of the real-time incident from the network operations center, the CAD identifier, or the sensor data from the portable recording device. In doing so, the categorization controller may analyze historical incidents to infer a likely incident category for the real-time incident. For example, the categorization controller may determine that the geolocation corresponds to a stretch of highway where vehicles often exceed the posted speed limit. In doing so, the categorization controller may infer that the likely incident category at the given geolocation is a speeding vehicle.

In another embodiment, the categorization controller may retrieve environmental data from the third-party server(s) to infer an ordered ranking of incident categories. The environmental data may correspond to third-party news reports, social media postings, weather reports, or the like, which describe the disposition of a surrounding environment and the real-time events that are occurring proximate to the geolocation of the real-time incident. For example, the categorization controller may capture environmental data from social media postings that describe a violent protest at a commercial establishment that is proximate to the geolocation of the real-time incident. In this example, the categorization controller may infer that the likely incident category is "trespass." Without limitation, other likely incident categories may include "public nuisance," and "property damage." The categorization controller may infer a likely ordered ranking of the incident categories (e.g., trespass, public nuisance, and property damage) based on an NLP and NLU analysis of the social media postings.

At 508, the categorization controller may generate incident category data that comprises the ordered ranking of the incident categories. The incident category data may include one incident category, or an ordered ranking of two incident categories, five incident categories, or ten incident categories. An ordered ranking of any number of incident categories is possible.

At 510, the categorization controller may transmit the incident category data to the portable recording device that has been dispatched to the real-time incident. The incident category data may include computer-executable instructions that are configured to present the ordered ranking of the incident categories via a user interface of the portable recording device. In one embodiment, the user interface may comprise a category wheel, as illustrated in FIG. 4. In another embodiment the user interface may comprise a category slide. Any user interface is possible, provided the user interface can facilitate the selection of an incident category from a plurality of incident categories.

The incident category data may be configured such that the first selection via the user interface of the portable recording device corresponds to the highest-ranked incident category of the ordered ranking of incident categories. For example, if the categorization controller infers that a real-time incident is likely a "speeding vehicle" then the first selection presented via the user interface of the portable recording device may correspond to a "speeding vehicle" incident category.

Figure 6:
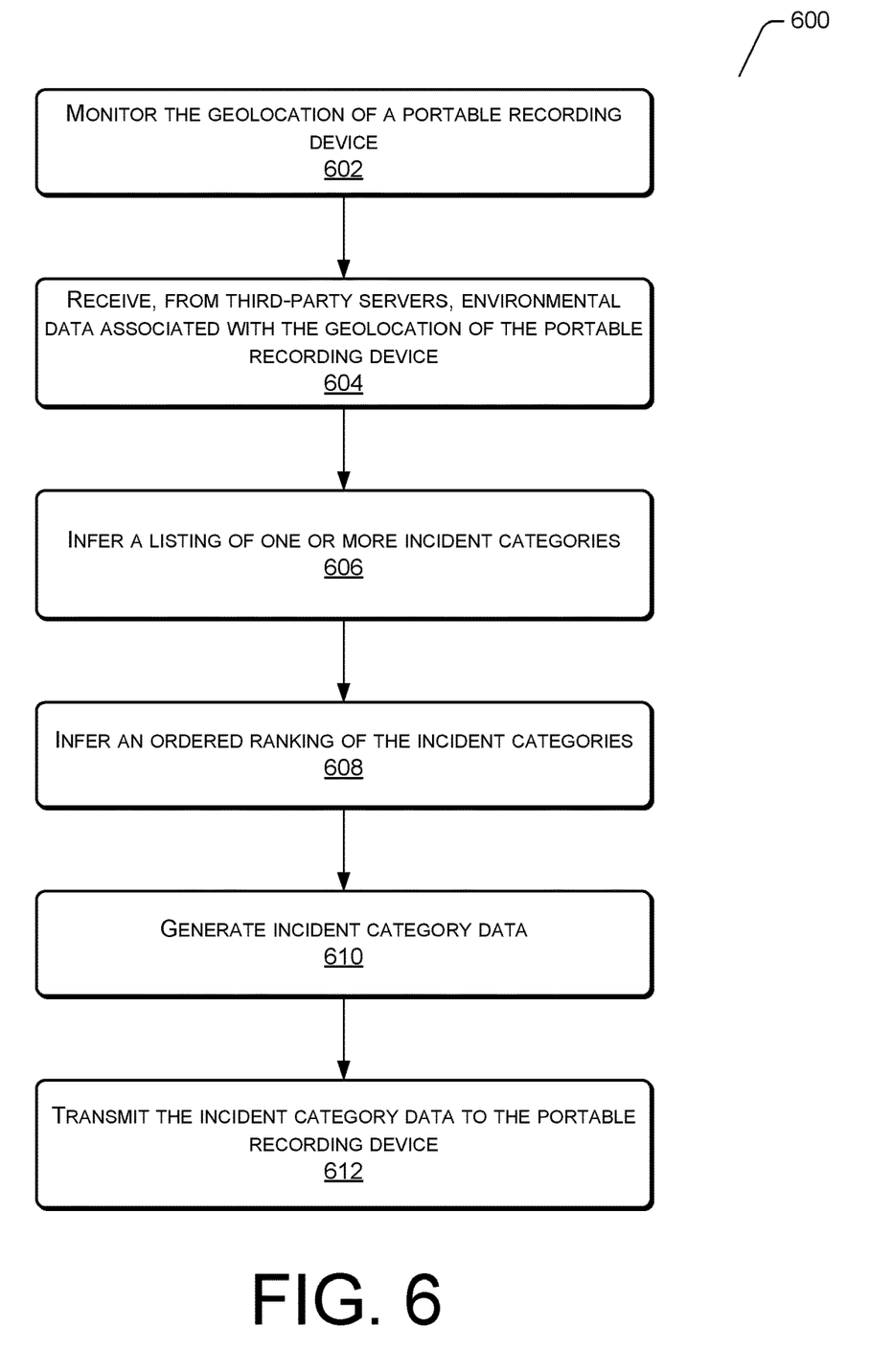
FIG. 6 illustrates a process for generating and transmitting incident category data to a portable recording device based at least in part on environmental data.

FIG. 6 illustrates a process for generating and transmitting incident category data to a portable recording device based at least in part on environmental data. Process 600 is described from the perspective of the categorization controller. In process 600, the categorization controller may interface with a network operations center, a portable recording device, and third-party server(s) that capture the environmental data.

At 602, the categorization controller may monitor the geolocation of a portable recording device associated with a user (e.g., law enforcement officer) dispatched to a real-time incident. Monitoring may occur continuously, per a predetermined schedule, or in response to a triggering event. Without limitation, the predetermined schedule may correspond to a time interval of one minute, five minutes, 20 minutes, 30 minutes, or one hour. Any time interval is possible. The triggering event may correspond to receipt of a message from the network operations center indicating that the portable recording device (and law enforcement officer) has been dispatched to a real-time incident at the geolocation.

At 604, the categorization controller may receive from a third-party server(s), environmental data associated with the geolocation of a portable recording device. In this example, the environmental data may correspond to third-party news reports, social media posting, weather reports, or the like, that describe the disposition of a surrounding environment and the real-time events that are occurring proximate to the current geolocation of the portable recording device.

In other embodiments, the categorization controller may receive additional data associated with the geolocation of the portable recording device. Additional data may include a CAD identifier from the network operations center, sensor data from the portable recording device, or a suitable combination of both.

At 606, the categorization controller may employ one or more machine-learning algorithms to infer a listing of one or more incident categories that likely describe the real-time incident, based at least in part on the environmental data. For example, if news reports describe a "multi-vehicle collision" at the geolocation that corresponds to the portable recording device, the categorization controller may infer, without limitation, that the one or more incidents may include "multi-vehicle collision," "multi-vehicle collision with property damage," "multi-vehicle collision with injured persons," "multi-vehicle collision with injured persons and property damage," and any other suitable incident category.

In other embodiments, the categorization controller may infer the listing of one or more incident categories, based on the environmental data and additional data (e.g., CAD identifier, sensor data, or a suitable combination of both).

At 608, the categorization controller may further employ one or more machine-learning algorithms to infer an ordered ranking of the incident categories, based at least in part on the environment data. The ordered ranking is intended to represent the likelihood that the real-time incident corresponds to a particular incident category. For example, if a news report describes a multi-vehicle collision with injured persons, then the categorization controller may infer that the likely incident category corresponds to "multi-vehicle collision with injured persons." In this example, the categorization controller may assign a superior ranking to the "multi-vehicle collision with injured persons" incident category. The remaining incident categories may be assigned inferior ordered rankings based on analysis of the environmental data. For example, if the multi-vehicle collision occurred in a densely populated geolocation, the next likely incident category may be "multi-vehicle collision with injured persons and property damage," and so forth.

In other embodiments, the categorization controller may infer the ordered ranking of incident categories, based on the environmental data and additional data (e.g., CAD identifier, sensor data, or a suitable combination of both).

At 610, the categorization controller may generate incident category data that comprises the ordered ranking of the incident categories. The incident category data may include one incident category or an ordered ranking of any number of incident categories.

At 612, the categorization controller may transmit the incident category data to the portable recording device that has been dispatched to the real-time incident. The incident category data may include computer-executable instructions that are configured to present the ordered ranking of the incident categories via a user interface (e.g., category selector) of the portable recording device. The incident category data may be configured such that the first selection via the user interface of the portable recording device corresponds to the highest-ranking incident category of the ordered ranking of incident categories.

Figure 7:
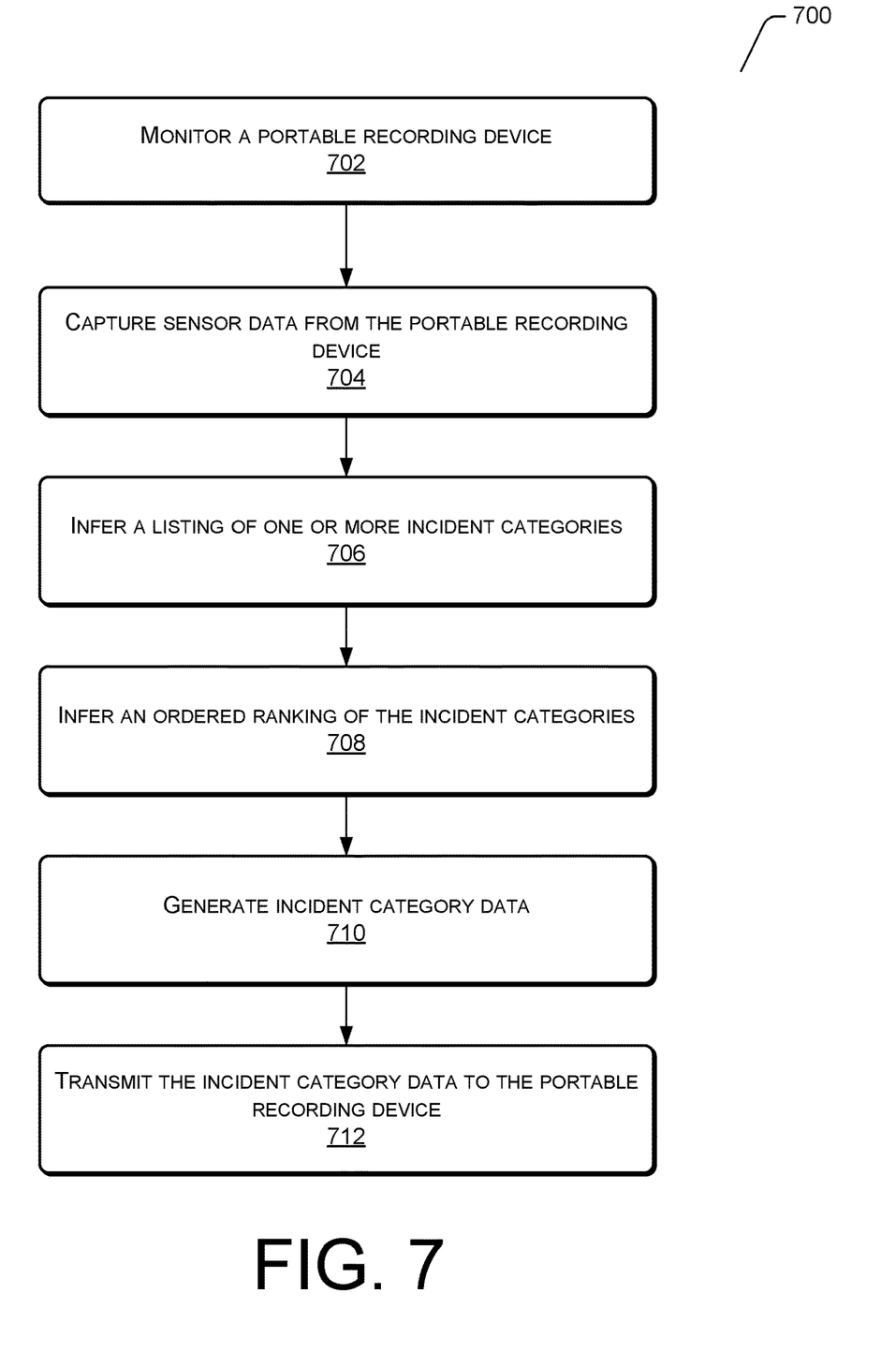
FIG. 7 illustrates a process for generating and transmitting incident category data to a portable recording device based at least in part on sensor data captured from a portable recording device.

FIG. 7 illustrates a process for generating and transmitting incident category data to a portable recording device based at least in part on sensor data captured from a portable recording device. Process 700 is described from the perspective of the categorization controller. In process 700, the categorization controller may interface with at least the portable recording device.

At 702, the categorization controller may monitor a portable recording device associated with a user (e.g., law enforcement officer) dispatched to a real-time incident. The monitoring activity may comprise capturing sensor data from the portable recording device at the geolocation, or proximate to the geolocation, of a real-time incident. Monitoring may occur continuously, per a predetermined schedule, or in response to a triggering event. Without limitation, the predetermined schedule may correspond to any time interval, such as one minute, five minutes, 20 minutes, 30 minutes, or one hour. The triggering event may correspond to receipt of a message from the network operations center indicating that the portable recording device (and law enforcement officer) has been dispatched to a real-time incident at the geolocation.

At 704, the categorization controller may interrogate sensor data captured from the portable recording device as part of the monitoring activity. The sensor data may include the geolocation of the portable recording device (which, further corresponds to a geolocation of the real-time incident), audio data recorded via the portable recording device by the law enforcement officer, and a real-time multimedia stream of the surrounding environment proximate to the portable recording device (which, by extension corresponds to a real-time multimedia stream of the real-time incident).

At 706, the categorization controller may employ one or more machine-learning algorithms to infer a listing of one or more incident categories that likely describe the real-time incident, based at least in part on the sensor data. For example, if the sensor data includes a multimedia stream of individuals in "heated quarrel," the categorization controller may analyze the images and audio of the multimedia stream and the geolocation to infer that the real-time incident likely corresponds to a "public nuisance," "domestic disturbance," "trespass", or any other suitable incident category.

In other embodiments, the categorization controller may infer the listing of one or more incident categories, based on the sensor data and additional data (e.g., CAD identifier, environmental data, or a suitable combination of both).

At 708, the categorization controller may further employ one or more machine-learning algorithms to infer an ordered ranking of the incident categories, based at least in part on the sensor data. The ordered ranking is intended to represent the likelihood that the real-time incident corresponds to a particular incident category. For example, if the geolocation corresponds to a residential area, then the categorization controller may infer that the likely incident category of the "heated quarrel" is a "domestic disturbance." In this example, the categorization controller may assign a superior ranking to "domestic disturbance" relative to the rankings of "public nuisance," "trespass," and any other suitable incident category.

In other embodiments, the categorization controller may infer the ordered ranking of incident categories, based on the sensor data and additional data (e.g., CAD identifier, environmental data, or a suitable combination of both).

At 710, the categorization controller may generate incident category data that comprises the ordered ranking of the incident categories. The incident data may include one incident category or an ordered ranking of any number of incident categories.

At 712, the categorization controller may transmit the incident category data to the portable recording device that has been dispatched to the real-time incident. The incident category data may include computer-executable instructions that are configured to present the ordered ranking of the incident categories via a user interface (e.g., category selector) of the portable recording device. The incident category data may be configured such that the first selection via the user interface of the portable recording device corresponds to the highest-ranking incident category of the ordered ranking of incident categories.

Figure 8:
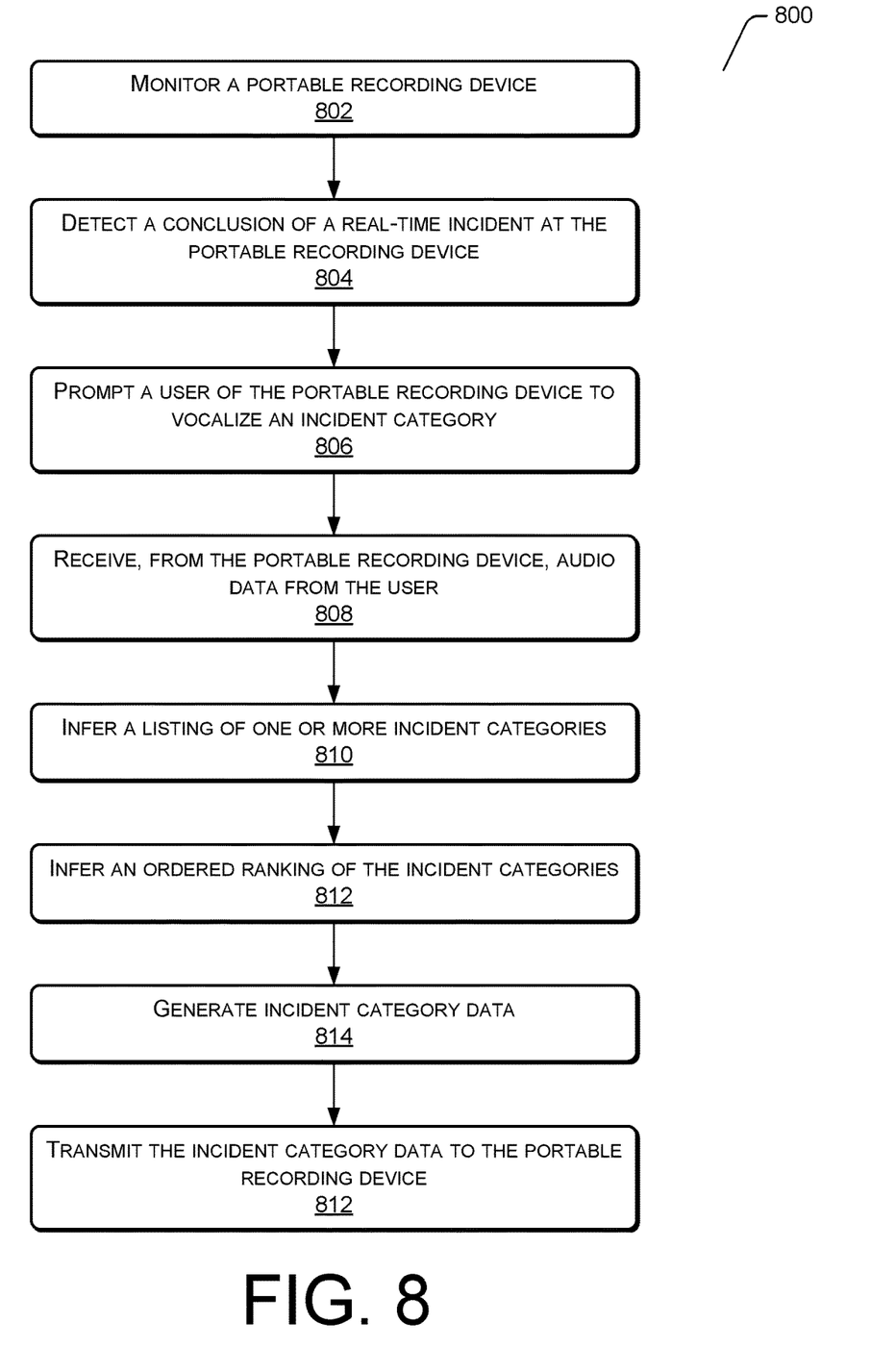
FIG. 8 illustrates a process for generating and transmitting incident category data to a portable recording device based at least in part on an audio data recording.

FIG. 8 illustrates a process for generating and transmitting incident category data to a portable recording device based at least in part on an audio data recording. Process 800 is described from the perspective of the categorization controller. In process 800, the categorization controller may interface with at least the portable recording device.

At 802, the categorization controller may monitor a portable recording device associated with a user (e.g., law enforcement officer) dispatched to a real-time incident. The monitoring activity may comprise capturing sensor data from the portable recording device at the geolocation, or proximate to the geolocation, of a real-time incident. Monitoring may occur continuously, per a predetermined schedule, or in response to a triggering event. Without limitation, the predetermined schedule may correspond to any time interval, such as one minute, five minutes, 20 minutes, 30 minutes, or one hour. The triggering event may correspond to receipt of a message from the network operations center indicating that the portable recording device (and law enforcement officer) has been dispatched to a real-time incident at the geolocation.

At 804, the categorization controller may detect a conclusion of a real-time incident at the portable recording device. The conclusion may be signposted by an end of a multimedia stream captured via the portable recording device.

At 806, the categorization controller may transmit a message to the portable recording device that prompts the user (e.g., law enforcement officer) to vocalize an incident category associated with the real-time incident.

At 808, the categorization controller may receive, from the portable recording device, audio data from the user (e.g., law enforcement officer), describing the real-time incident. In one embodiment, the audio data may comprise an annunciation of pseudonymous identifiers known to law enforcement personnel as describing incident categories. For example, in some jurisdictions, a "10-99" code means "cardiac arrest/officer held hostage" or "10-107" means "suspicious person." In another embodiment, the audio data may comprise an annunciation of laymen terms describing the actual real-time incident. For example, the description may be "cardiac arrest" or "officer held hostage."

At 810, the categorization controller may employ one or more machine-learning algorithms to infer a listing of one or more incident categories that likely describe the real-time incident. In some examples, the audio data may ambiguously describe multiple incident categories. For example, the pseudonymous identifier "10-99" describes "cardiac arrest" and "officer held hostage." In these instances, the categorization controller may infer a plurality of incident categories, rather than one incident category.

At 812, the categorization controller may further employ one or more machine-learning algorithms to infer an ordered ranking of the incident categories, based at least in part on the audio data. The ordered ranking is intended to represent the likelihood that the real-time incident corresponds to a particular incident category. For example, accompanying annunciation of "he's not breathing" may imply that a "10-99" code is more likely to relate to "cardiac arrest" than to "officer held hostage." In this example, the categorization controller may assign a superior ranking to the "cardiac arrest" incident category relative to the "officer held hostage" incident category.

In other embodiments, the categorization controller may infer the ordered ranking categories based on the audio data and additional data. Additional data may comprise other sensor data captured from the portable recording device (e.g., geolocation, multimedia stream, etc.), a CAD identifier retrieved from the network operations center, environmental data (e.g., news reports, social media posts, weather reports) retrieved from third-party servers, or any suitable combination thereof.

At 814, the categorization controller may generate incident category data that comprises the ordered ranking of the incident categories. The incident category data may include one incident category or an ordered ranking of any number of incident categories.

At 816, the categorization controller may transmit the incident category data to the portable recording device that has been dispatched to the real-time incident. The incident category data may include computer-executable instructions that are configured to present the ordered ranking of the incident categories via a user interface (e.g., category selector) of the portable recording device. The incident category data may be configured such that the first selection via the user interface of the portable recording device corresponds to the highest-ranking incident category of the ordered ranking of incident categories.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
one or more processors;
memory coupled to the one or more processors, the memory including one or more modules that are executable by the one or more processors to:
identify a set of categories that are likely associated with a real-time multimedia stream;
generate a data model to infer an ordered ranking of individual incident categories, based at least in part on historical event data;
determine, by the data model, the ordered ranking of the individual incident categories of the set of categories;
generate incident category data to present the ordered ranking of the individual incident categories via a portable recording device; and
send the incident category data to the portable recording device.

2. The system of claim 1, wherein the one or more modules are further executable by the one or more processors to:
retrieve, from a network operations controller, a computer-aided dispatch (CAD) identifier associated with a current event,
wherein to identify the set of categories is based at least in part on the CAD identifier.

3. The system of claim 1, wherein the one or more modules are further executable by the one or more processors to:
retrieve, from a third-party server, environmental data associated with a current event, and
wherein, to identify the set of categories is based at least in part on the environmental data.

4. The system of claim 1, wherein the one or more modules are further executable by the one or more processors to:
determine a geolocation of the portable recording device; and
retrieve, from a third-party server, environmental data associated with the geolocation,
wherein to identify the set of categories is based at least in part on the environmental data.

5. The system of claim 1, wherein the one or more modules are further executable by the one or more processors to:
receive, from the portable recording device, sensor data associated with a surrounding environment proximate to the portable recording device,
wherein to identify the set of categories is based at least in part on the sensor data.

6. The system of claim 1, wherein the one or more modules are further executable by the one or more processors to:
receive, from the portable recording device, audio data that describes a current event,
wherein to identify the set of categories is based at least in part on analysis of the audio data.

7. The system of claim 1, wherein the one or more modules are further executable by the one or more processors to:
receive input data that is associated with a current event, the input data including at least one of a CAD identifier, environmental data, or sensor data associated with the portable recording device,
wherein to determine, by the data model, the ordered ranking of the individual incident categories is based at least in part on an analysis of the input data using the data model.

8. The system of claim 7, wherein the one or more modules are further executable by the one or more processors to:
generate an accuracy score for the individual incident categories of the set of categories, based at least in part on the analysis of the input data, the accuracy score to indicate a likelihood that the individual incident categories are associated with the current event,
wherein to determine, by the data model, the ordered ranking of the individual incident categories is further based at least in part on the accuracy score of the individual incident categories.

9. The system of claim 7, wherein the incident category data further includes computer-executable instructions that cause the ordered ranking of the individual incident categories to be presented for selection via a category selector of the portable recording device, wherein a first selection of the category selector corresponds to a superior ranked individual incident category of the ordered ranking of the individual incident categories.

10. One or more non-transitory computer-readable media collectively storing computer-executable instructions that, when executed with one or more processors, collectively cause computers to perform acts comprising:
  retrieving, from a network operations center, a computer-aided dispatch (CAD) identifier;
  identifying a set of categories that are likely associated with a real-time multimedia stream, based at least in part on the CAD identifier;
  generating a data model to determine an ordered ranking of individual incident categories, based at least in part on historical event data;
  determining, by the data model, the ordered ranking of the individual incident categories of the set of categories;
  generating incident category data to present the ordered ranking of the individual incident categories via a portable recording device; and
  send the incident category data to the portable recording device.

11. The one or more non-transitory computer-readable media of claim 10, wherein the acts further comprise:
  retrieving, from the portable recording device, sensor data associated with a surrounding environment proximate to the portable recording device,
  wherein determining, by the data model, the ordered ranking of the individual incident categories is based at least in part on the sensor data.

12. The one or more non-transitory computer-readable media of claim 11, wherein the sensor data comprises at least one of a geolocation or the real-time multimedia stream.

13. The one or more non-transitory computer-readable media of claim 10, wherein the acts further comprise:
  retrieving from a third-party server, environmental data associated with a geolocation of the portable recording device,
  wherein determining, by the data model, the ordered ranking of the individual incident categories is based at least in part on the environmental data.

14. The one or more non-transitory computer-readable media of claim 10, wherein the acts further comprise:
  receiving input data associated with a current event, the input data corresponding to one of the CAD identifier, environmental data, or sensor data associated with the portable recording device,
  wherein determining, by the data model, the ordered ranking of the individual incident categories is based at least in part on an analysis of the input data using the data model.

15. The one or more non-transitory computer-readable media of claim 14, wherein the acts further comprise:
  generating an accuracy score for the individual incident categories of the set of categories, based at least in part on the analysis of the input data using the data model,
  wherein determining, by the data model, the ordered ranking of the individual incident categories is further based at least in part on the accuracy score of the individual incident categories.

16. A portable recording device, comprising:
  a user interface;
  one or more sensors;
  one or more processors; and
  memory coupled to the one or more processors, the memory including one or more modules that are executable by the one or more processors to:
    capture, via the one or more sensors, sensor data associated with a surrounding environment proximate to the portable recording device;
    transmit the sensor data to a categorization controller;
    generate a data model to infer an ordered ranking of individual incident categories, based at least in part on historical event data;
    determine, by the data model, the ordered ranking of the individual incident categories;
    receive, from the categorization controller, incident category data, based at least in part on the sensor data, the incident category data including computer-executable instructions to present, at the user interface, the ordered ranking of the individual incident categories of a set of categories that are likely associated with a real-time multimedia stream; and
    execute the instructions in the incident category data to present the ordered ranking of the individual incident categories via the user interface.

17. The portable recording device of claim 16, wherein the one or more sensors are further configured to capture the real-time multimedia stream of a current event.

18. The portable recording device of claim 16, wherein the user interface comprises a category selector, and wherein the computer-executable instructions cause the ordered ranking of the individual incident categories to be presented for selection via the category selector, a first selection of the category selector corresponding to a superior ranked individual incident category of the ordered ranking of the individual incident categories.

19. The portable recording device of claim 16, wherein the sensor data comprises audio data that anecdotally describes a current event at a geolocation of the portable recording device.

20. The portable recording device of claim 16, wherein an individual incident category of the ordered ranking of the individual incident categories, corresponds to a class of events, the class of events including at least one of a domestic disturbance, a traffic infraction, violent dispute, property damage, trespass, protest, or public nuisance.

* * * * *